United States Patent

Kishimoto et al.

Patent Number: 5,724,266
Date of Patent: Mar. 3, 1998

[54] AUTOMATIC INITIALIZATION METHOD APPLIED TO DEVICE FOR DETECTING PNEUMATIC ABNORMALITIES ON THE BASIS OF VARIATIONS IN ANGULAR VELOCITY OF TIRE

[75] Inventors: Yoshikazu Kishimoto, Kakogawa; Minao Yanase, Kobe, both of Japan

[73] Assignee: Sumitomo Rubber Industries, Ltd., Hyogo-ken, Japan

[21] Appl. No.: 641,265

[22] Filed: Apr. 30, 1996

Related U.S. Application Data

[63] Continuation of Ser. No. 169,174, Dec. 20, 1993, abandoned.

[30] Foreign Application Priority Data

Dec. 21, 1992 [JP] Japan ................................ 4-339998

[51] Int. Cl.⁶ .................................................. B60C 23/00
[52] U.S. Cl. ............... 364/566; 364/565; 364/424.034; 73/146.2; 73/146.5; 340/442; 340/444
[58] Field of Search .................................. 364/565, 566, 364/424.053, 424.046, 424.058, 426.016, 426.021, 426.023, 426.037, 426.038; 73/146.2, 146.5; 307/10.1; 340/442, 444

[56] References Cited

U.S. PATENT DOCUMENTS

| | | | |
|---|---|---|---|
| 4,567,460 | 1/1986 | Gebler | 73/146.5 |
| 4,876,528 | 10/1989 | Walker et al. | 73/146.5 |
| 5,099,443 | 3/1992 | Higashimata et al. | 364/565 |
| 5,122,955 | 6/1992 | Ishikawa et al. | 364/424.05 |
| 5,172,318 | 12/1992 | Meissner et al. | 364/566 |
| 5,218,862 | 6/1993 | Hurrell, II et al. | 73/146.5 |
| 5,239,469 | 8/1993 | Walker et al. | 73/146.5 |
| 5,248,957 | 9/1993 | Walker et al. | 73/146.2 |
| 5,252,946 | 10/1993 | Walker et al. | 73/146.2 |
| 5,274,576 | 12/1993 | Williams | 364/565 |
| 5,282,135 | 1/1994 | Sato et al. | 364/424.05 |
| 5,299,131 | 3/1994 | Haas et al. | 364/565 |
| 5,343,741 | 9/1994 | Nishihara et al. | 73/146.2 |
| 5,345,217 | 9/1994 | Prottey | 73/146.5 |

FOREIGN PATENT DOCUMENTS

| | | |
|---|---|---|
| 0466535 | 1/1992 | European Pat. Off. . |
| 0512745 | 11/1992 | European Pat. Off. . |
| 3236520 | 4/1984 | Germany . |
| 63-305011 | 12/1988 | Japan . |

*Primary Examiner*—James P. Trammell
*Assistant Examiner*—Eric W. Stamber
*Attorney, Agent, or Firm*—Birch, Stewart, Kolasch & Birch, LLP

[57] ABSTRACT

An automatic initialization method including the steps of: measuring and monitoring acceleration of a vehicle in a lateral direction, defining correction values for each tire of the vehicle, and obtaining baseline values under normal pneumatic pressure conditions by using only data of angular velocity of rotation of each tire when the acceleration of the vehicle in the lateral direction ranges from −0.03 g to +0.03 g, when the steering angle of the vehicle ranges from −15° to +15°, or when both the lateral acceleration and the steering angle are in the specified ranges. In the method of the present invention, only the data of angular velocities of tires is automatically picked up in the optimum driving status and initialization can be performed with high precision.

3 Claims, No Drawings

AUTOMATIC INITIALIZATION METHOD APPLIED TO DEVICE FOR DETECTING PNEUMATIC ABNORMALITIES ON THE BASIS OF VARIATIONS IN ANGULAR VELOCITY OF TIRE

This application is a continuation, of application Ser. No. 08/169,174 filed on Dec. 20, 1993, now abandoned.

BACKGROUND OF THE INVENTION

The present invention relates to a method of automatic initialization of a system in a device for detecting pneumatic abnormalities of a tire on the basis of variations in angular velocity of the tire (refer to, for example, Japanese Unexamined Patent Publication No. 305011/1988).

When pneumatic pressure of a tire varies, angular velocity of rotation of the tire varies even if vehicles are driving at a constant speed. With this relationship, there have been proposed some methods for detecting pneumatic abnormalities of a tire by mutually comparing angular velocities of tires.

For example, in the Japanese Unexamined Patent Publication No. 305011/1988, a method which gives an alarm of pressure deflation of tires to a driver is disclosed. In the method, angular velocity of each tire is detected and respective sums of angular velocities of each pair of diagonally opposite tires are determined. When the difference between the sums is in the range of 0.05% to 0.6% with respect to the average of the sums and the difference between the angular velocity of either one of the tires and the average value of the four tires is not less than 0.1%, the alarm of pressure deflation is given.

However, tires arranged on a vehicle are not always standard and there is a dispersion in the circumferencial length even when the tires are the same standard tires. Further, the weight on each tire differs from one to another. The tires of one vehicle, therefore, rotate respectively at different angular velocities even when the vehicle is driven with tires under normal pneumatic pressure. Thus, in the device utilizing the above-mentioned principle, it is required to previously correct the dispersion of angular velocities of rotation of the tires under normal pneumatic pressure. The correction is generally called "initialization."

The initialization means that dispersion at an initial stage is corrected by obtaining a ratio of angular velocity of each tire under normal pneumatic pressure. However, a wrong correction would be made by the initialization when drivers are turning a corner. Therefore, drivers are annoyed that they must keep vehicles at a constant speed and must run a straight course during the initialization.

It is an object of the invention to provide a method of automatic initialization with high precision which saves drivers their labor by measuring acceleration in a lateral direction or steering angle of a vehicle and automatically picking up the data within a specific range.

SUMMARY OF THE INVENTION

In accordance with the present invention, there is provided a method of initialization in a device for detecting pneumatic abnormalities of a tire on the basis of variations in angular velocity of the tire comprising, a step of measuring and monitoring acceleration of a vehicle in a lateral direction, and a step of obtaining correction values by using only data of angular velocity of rotation of each tire when the acceleration of the vehicle in the lateral direction ranges from −0.03 g to +0.03 g.

Also, according to the method of the present invention, correction values can be obtained from measuring and monitoring a steering angle of a vehicle and using only data of angular velocity of rotation of each tire when the steering angle ranges from −15° to +15°.

Further, according to the method of the present invention, correction values can be obtained from measuring and monitoring acceleration in the lateral direction and a steering angle of a vehicle and using only data of angular velocity of rotation of each tire when the acceleration in the lateral direction ranges from −0.03 g to +0.03 g and when the steering angle ranges from −15° to +15°.

According to the method of the present invention, only data of angular velocity of rotation of each tire when an acceleration in the lateral direction and a steering angle are within a specific range, are automatically picked up and used for performing initialization of a device for detecting pneumatic abnormalities of a tire.

DETAILED DESCRIPTION OF THE INVENTION

The automatic initialization method of the present invention is described herebelow.

At first, acceleration in the lateral direction of a vehicle is measured with a lateral gravity sensor such as a piezoelectric acceleration transducer or a strain gauge acceleration transducer, mounted on the vehicle. The measured acceleration is monitored with a microcomputer and the like.

On the other hand, angular velocity of rotation of each tire is measured with a rotation pulse generator and the like to be always monitored by a microcomputer and the like.

Correction values are obtained by using only the data, which is automatically picked up by the microcomputer and the like, of the angular velocity of rotation of each tire when the acceleration in the lateral direction ranges from −0.03 g to +0.03 g (g: gravity). When the acceleration in the lateral direction is out of the range, the measured data cannot be used because turning of the vehicle makes a difference between the angular velocities of the inner tire and the outer tire so that wrong correction values would be made.

In the case, under the normal condition of each tire, angular velocities of rotation of four tires are denoted A, B, C and D respectively, the correction values for four tires are defined as for example, Ac=A/A, Bc=A/B, Cc=A/C and Dc=A/D respectively. That is, if the angular velocities of rotation under normal condition of each tire are detected to be A=1.0, B=1.05, C=1.0 and D =1.0 at an initialization, the correction values are Ac=1.0, Bc=0.9524, Cc=1.0 and Dc=1.0 respectively. Then, in the case when the detected angular velocities of four tires are A'=2.0, B'=2.10, C'=2.0 and D'=2.0 when the vehicle is driven, tire B is regarded as a deflated one unless a correction is performed, though in this case pneumatic pressure of each tire is normal. However, the detected value of angular velocity of each tire is multipled by the correction value so that Ac×A' (=2.0), Bc×B' (=2.0), Cc×C' (=2.0) and Dc×D' (=2.0) are used respectively as the angular velocity of each tire. Hence, it is determined that the pneumatic pressure of all the tires is normal.

Also, instead of acceleration in the lateral direction, it is also preferable that a steering angle with respect to the driving direction is measured with an steering angle sensor such as a rotational angle meter utilizing a potentiometer and the like mounted on a vehicle, and is always monitored with a microcomputer and the like.

Next, correction values are obtained by using only the data, which is automatically picked up with a microcomputer (using the program included therein) and the like, of the angular velocity of rotation of each tire when the steering angle ranges from −15° to +15° (the steering angle is set at 0° when the vehicle takes a straight course). When the steering angle is out of the range, it is regarded that the vehicle is turning and the measured data cannot be used because the turning makes the differences among the angular velocities of the tires so that accurate correction values cannot be obtained. The correction values are handled in the same manner as stated above.

Further, both the gravity sensor in the lateral direction and the steering angle sensor are preferably mounted on the vehicle. In that case, only the data of angular velocity of rotation of each tire is automatically picked up when angular velocity in the lateral direction ranges from −0.03 g to +0.03 g and the steering angle ranges from −15° to +15°, and the data is used for obtaining correction values. In such case, the initialization is more accurate than those in the above embodiments.

When the initialization of the device for detecting pneumatic abnormalities is performed according to the above methods, once a driver presses a start button of initialization, only the data of angular velocities of tires is automatically picked up the optimum driving status and initialization is performed with high precision.

According to the method of the present invention, only the data of angular velocities of tires is automatically picked up in the optimum driving status and initialization can be performed with high precision.

Though several embodiments of the present invention are described above, it is to be understood that the present invention is not limited only to the above-mentioned and various changes and modifications may be made in the invention without departing from the spirit and scope thereof.

What we claim is:

1. An automatic initialization method in a device for detecting pneumatic abnormality of a tire on the basis of variations in angular velocity of the tire wherein angular velocities of tires are relatively compared with one another and if a predetermined difference exists an alarm for tire deflation is issued, comprising the steps of:

measuring and monitoring acceleration of a vehicle in a lateral direction, obtaining for each tire 1, 2, 3 and 4, under normal tire pressure, an angular velocity of rotation A, B, C and D, respectively and only using the data of angular velocity of rotation of each corresponding tire when the acceleration of the vehicle in the lateral direction ranges from −0.03 g to +0.03 g, and obtaining a correction value for each tire Ac, Bc, Cc and Dc from the angular velocity of rotation A, B, C and D of corresponding tire 1, 2, 3 and 4, respectively, on the basis of the following formulas:

$Ac = A/A$ $Bc = A/B$ $Cc = A/C$ $Dc = A/D$ wherein the device is so designed to relatively compare Ac×A'; Bc×B'; Cc×C' and Dc×D', A', B', C' and D' being defined as angular velocities of rotation detected for each corresponding tire, respectively, when the vehicle is running.

2. An automatic initialization method in a device for detecting pneumatic abnormality of a tire on the basis of variations in angular velocity of the tire wherein angular velocities of tires are relatively compared with one another and if a predetermined difference exists an alarm for tire deflation is issued, comprising the steps of:

measuring and monitoring a steering angle of a vehicle, obtaining for each tire 1, 2, 3 and 4, under normal tire pressure, an angular velocity of rotation A, B, C and D, respectively, and only using the data of angular velocity of rotation of each corresponding tire when the steering angle of the vehicle ranges from −15° to +15°, and obtaining a correction value for each tire Ac, Bc, Cc and Dc from the angular velocity of rotation A, B, C and D of corresponding tire 1, 2, 3 and 4, respectively, on the basis of the following formulas:

$Ac = A/A$ $Bc = A/B$ $Cc = A/C$ $Dc = A/D$ wherein the device is so designed to relatively compare Ac×A'; Bc×B'; Cc×C' and Dc×D', A', B', C' and D' being defined as angular velocities of rotation detected for each corresponding tire, respectively, when the vehicle is running.

3. An automatic initialization method in a device for detecting pneumatic abnormality of a tire on the basis of variations of angular velocity of the tire wherein angular velocities of tires are relatively compared with one another and if a predetermined difference exists an alarm for tire deflation is issued, comprising the steps of:

measuring and monitoring acceleration of a vehicle in the lateral direction, measuring and monitoring a steering addle of the vehicle, obtaining for each tire 1, 2, 3 and 4, under normal tire pressure, an angular velocity of rotation A, B, C and D, respectively, and only using the data of angular velocity of rotation of each corresponding tire when the acceleration in the lateral direction ranges from −0.03 g to +0.03 g and the steering angle of the vehicle ranges from −15° to +15°, and obtaining a correction value for each tire Ac, Bc, Cc and Dc from the angular velocity of rotation A, B, C and D of corresponding tire 1, 2, 3 and 4, respectively, on the basis of the following formulas:

$Ac = A/A$ $Bc = A/B$ $Cc = A/C$ $Dc = A/D$ wherein the device is so designed to relatively compare Ac ×A'; Bc×B'; Cc×C' and Dc×D', A', B', C' and D' being defined as angular velocities of rotation detected for each corresponding tire, respectively, when the vehicle is running.

* * * * *